United States Patent
Meier et al.

(10) Patent No.: US 8,557,932 B2
(45) Date of Patent: Oct. 15, 2013

(54) PROCESS FOR THE PREPARATION OF A MULTIMODAL POLYOLEFIN POLYMER WITH IMPROVED HYDROGEN REMOVAL

(75) Inventors: Gerhardus Meier, Frankfurt (DE); Michael Aulbach, Swistal-Heimerzheim (DE); Harald Prang, Erfstadt (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 13/516,697

(22) PCT Filed: Dec. 20, 2010

(86) PCT No.: PCT/EP2010/007785
§ 371 (c)(1), (2), (4) Date: Jul. 23, 2012

(87) PCT Pub. No.: WO2011/076371
PCT Pub. Date: Jun. 30, 2011

(65) Prior Publication Data
US 2012/0283396 A1   Nov. 8, 2012

Related U.S. Application Data

(60) Provisional application No. 61/338,664, filed on Feb. 22, 2010.

(30) Foreign Application Priority Data

Dec. 22, 2009   (EP) .................................... 09015836

(51) Int. Cl.
*C08F 2/00* (2006.01)
*C08F 210/00* (2006.01)
*B01J 19/18* (2006.01)

(52) U.S. Cl.
USPC .............................. 526/65; 422/134; 526/348

(58) Field of Classification Search
USPC ....................................... 526/65, 348; 422/134
See application file for complete search history.

(56) References Cited

U.S. PATENT DOCUMENTS

| 4,352,915 A | 10/1982 | Mashita et al. |
| 6,225,421 B1 | 5/2001 | Promel et al. |
| 6,924,340 B2 * | 8/2005 | McGrath .......................... 526/65 |

FOREIGN PATENT DOCUMENTS

| EP | 0897934 | 2/1999 |
| WO | WO-2005077992 | 8/2005 |

*Primary Examiner* — William Cheung

(57) ABSTRACT

Process for the preparation of a multimodal polyolefin polymer at temperatures of from 40 to 150° C. and pressures of from 0.1 to 20 MPa in the presence of a polymerization catalyst in a first and a second polymerization reactor connected in series, wherein further polymerization reactors can be connected to said reactors upstream or downstream of said reactors, in which in the first polymerization reactor a first polyolefin polymer is prepared in suspension in the presence of hydrogen and in the second polymerization reactor a second polyolefin polymer is prepared in the presence of a lower concentration of hydrogen than in the first polymerization reactor, comprising a) withdrawing from the first polymerization reactor a suspension of solid polyolefin particles in a suspension medium comprising hydrogen;
b) feeding the suspension to a flash drum of a lower pressure than that of the first polymerization reactor;
c) vaporizing a part of the suspension medium;
d) withdrawing a hydrogen-depleted suspension from the flash drum and feeding it to the second polymerization reactor;
e) withdrawing gas from the gas-phase of the flash drum and feeding it to a heat exchanger;
f) condensing a part of the gas withdrawn from the flash drum; and g) returning the liquid obtained in the heat exchanger to the polymerization process at a point where suspension is present, and apparatus for preparing a multimodal polyolefin polymer according to the process.

15 Claims, 2 Drawing Sheets

PROCESS FOR THE PREPARATION OF A MULTIMODAL POLYOLEFIN POLYMER WITH IMPROVED HYDROGEN REMOVAL

This application is the U.S. national phase of International Application PCT/EP2010/007785, filed Dec. 20, 2010, claiming priority to European Application 09015836.1 filed Dec. 22, 2009 and the benefit under 35 U.S.C. 119(e) of U.S. Provisional Application No. 61/338,664, filed Feb. 22, 2010; the disclosures of International Application PCT/EP2010/007785, European Application 090158361.1 and U.S. Provisional Application No. 61/338,664, each as filed, are incorporated herein by reference.

DESCRIPTION

The present invention relates to a process for the preparation of a multimodal polyolefin polymer at temperatures of from 40 to 150° C. and pressures of from 0.1 to 20 MPa in the presence of a polymerization catalyst in a cascade of at least two polymerization reactors connected in series in suspension, in which the polymerization is carried out in the second polymerization reactor in the presence of a lower concentration of hydrogen than in the first polymerization reactor and it further relates to an apparatus for preparing a multimodal polyolefin polymer according to the present invention.

Suspension polymerization processes comprising two or more suspension polymerization reactors connected in series in which olefin monomers are polymerized in liquid medium have been known for many years. One of the reasons why cascades of two or more polymerization reactors are frequently used is that it is possible to set different reaction conditions in the polymerization reactors and thereby, for example, broaden the molecular weight distribution. Polyolefin polymers with a broad molecular weight distribution are commonly used for a multitude of applications because they show advantages in product properties and processability. Such polymers are also often designated as bimodal or more generally as multimodal polyolefin polymers because they are polymerized in a cascade of two or more polymerization reactors under different reaction conditions. The term "multimodal", as used herein and also frequently used in the art, shall include "bimodal".

Multimodal polyolefin polymer can theoretically be obtained in different ways. It is possible to prepare physical blends of previously polymerized different polyolefin components. It is possible to use mixtures of different catalysts or so-called hybrid catalysts, this means catalysts with at least two different types of polymerization active sites on one catalyst particle, in the same polymerization reactor. Commercially used is however predominantly the polymerization in a cascade of polymerization reactors, where a polymerization catalyst is fed together with monomers to a first reactor, the produced polymer, which still contains active polymerization catalyst, is transferred to a second polymerization reactor, which has different reactor conditions, and the polymerization is continued using the polymerization catalyst still contained in the polymer particle. A transfer to one or more next polymerization reactors with subsequent polymerization steps can of course follow. Normally the different reaction conditions in the different polymerization reactors are set by using different concentrations of hydrogen, which is commonly used as molecular weight regulator.

It has turned out to be advantageous to start such a cascaded polymerization process with a step of preparing a lower molecular weight polyolefin polymer in the presence of a higher concentration of hydrogen, removing at least a part of the hydrogen when transferring the suspension to the next polymerization reactor and continuing there the polymerization in the presence of a lower concentration of hydrogen.

U.S. Pat. No. 4,352,915 discloses a slurry polymerization process for producing an ethylene homopolymer or ethylene-α-olefin copolymer in multiple stages, in which the polymerization in the first stage is conducted in the presence of hydrogen with a molar ratio of gas phase hydrogen to ethylene of 0.5 to 15 and in the second stage with a molar ratio of gas phase hydrogen to ethylene ratio not exceeding 0.2.

EP 0 897 934 A1 describes a process for manufacturing an ethylene polymer composition where first an ethylene homopolymer having a melt flow rate $MFR_2$ of 5 to 1000 g/10 min is prepared and then in a subsequent reactor an ethylene/1-hexene copolymer having a melt flow rate $MFR_5$ of 0.01 to 2 g/10 min is produced. For removal of hydrogen from the reaction mixture of the first polymerization reactor, the reaction mixture withdrawn from the first polymerization reactor is subjected to an expansion step so as to vent at least some of the hydrogen.

U.S. Pat. No. 6,924,340 B2 refers to a process for the preparation of a polyolefin polymer, in which a polyolefin polymer is formed in the presence of hydrogen in a prior slurry reactor and the polymer product from the prior reactor is substantially freed of hydrogen prior to entry into a subsequent polymerization reactor operating at low hydrogen pressure to produce a high molecular weight olefin. The removal of hydrogen takes place by a series of at least two flash drums.

The removal of hydrogen from the suspension withdrawn from the first polymerization reactor is generally carried out by reducing the pressure and vaporizing a part of the suspension medium and thereby also reducing the concentration of solved gases like hydrogen in the suspension medium. Needless to say, the extracted components of the suspension medium are too valuable to be discarded. Accordingly, it is common to route them to a work-up section, which all polymerization plants for suspension polymerization have, for purifying and recovering the components of the suspension medium. Such a work-up of a combined off-gas stream is, for example, described in WO 2005/077992.

However, feeding the extracted components of the suspension to the work-up section constitutes an additional load of the work-up section and requires larger dimensions of the work-up section and also higher costs of operating it since larger volumes of product streams have to be handled. Accordingly, it would be desirable to find a way of reducing the concentration of hydrogen in a suspension of solid polyolefin particles in a suspension medium transferred from a first to a second suspension polymerization reactor without generating larger amounts of spin-off which need to be laboriously worked up.

Thus, it was the object of the present invention to overcome the disadvantages of the prior art and to find a process for reducing the concentration of hydrogen in a suspension of polymer particles transferred from a first to a second suspension polymerization reactor in an effective way and thereby reducing the amount of material needed to be treated in the work-up section.

We have found that this object is achieved by a process for the preparation of a multimodal polyolefin polymer at temperatures of from 40 to 150° C. and pressures of from 0.1 to 20 MPa in the presence of a polymerization catalyst in a first and a second polymerization reactor connected in series, wherein further polymerization reactors can be connected to said reactors upstream or downstream of said reactors, in which in the first polymerization reactor a first polyolefin polymer is prepared in suspension in the presence of hydrogen and in the second polymerization reactor a second polyolefin polymer is prepared in the presence of a lower concentration of hydrogen than in the first polymerization reactor, comprising a) withdrawing from the first polymerization reactor a suspension of solid polyolefin particles in a suspension medium comprising hydrogen;
b) feeding the suspension to a flash drum of a lower pressure than that of the first polymerization reactor;
c) vaporizing a part of the suspension medium;
d) withdrawing a hydrogen-depleted suspension from the flash drum and feeding it to the second polymerization reactor;
e) withdrawing gas from the gas-phase of the lash drum and feeding it to a heat exchanger;
f) condensing a part of the gas withdrawn from the flash drum; and
g) returning the liquid obtained in the heat exchanger to the polymerization process at a point where suspension is present.

Furthermore, we have found an apparatus for preparing a multimodal polyolefin polymer according to the process.

BRIEF DESCRIPTION OF THE SEVERAL VIEWS OF THE DRAWINGS

The features and advantages of the present invention can be better understood via the following description and the accompanying drawings, where.

Figure 1:
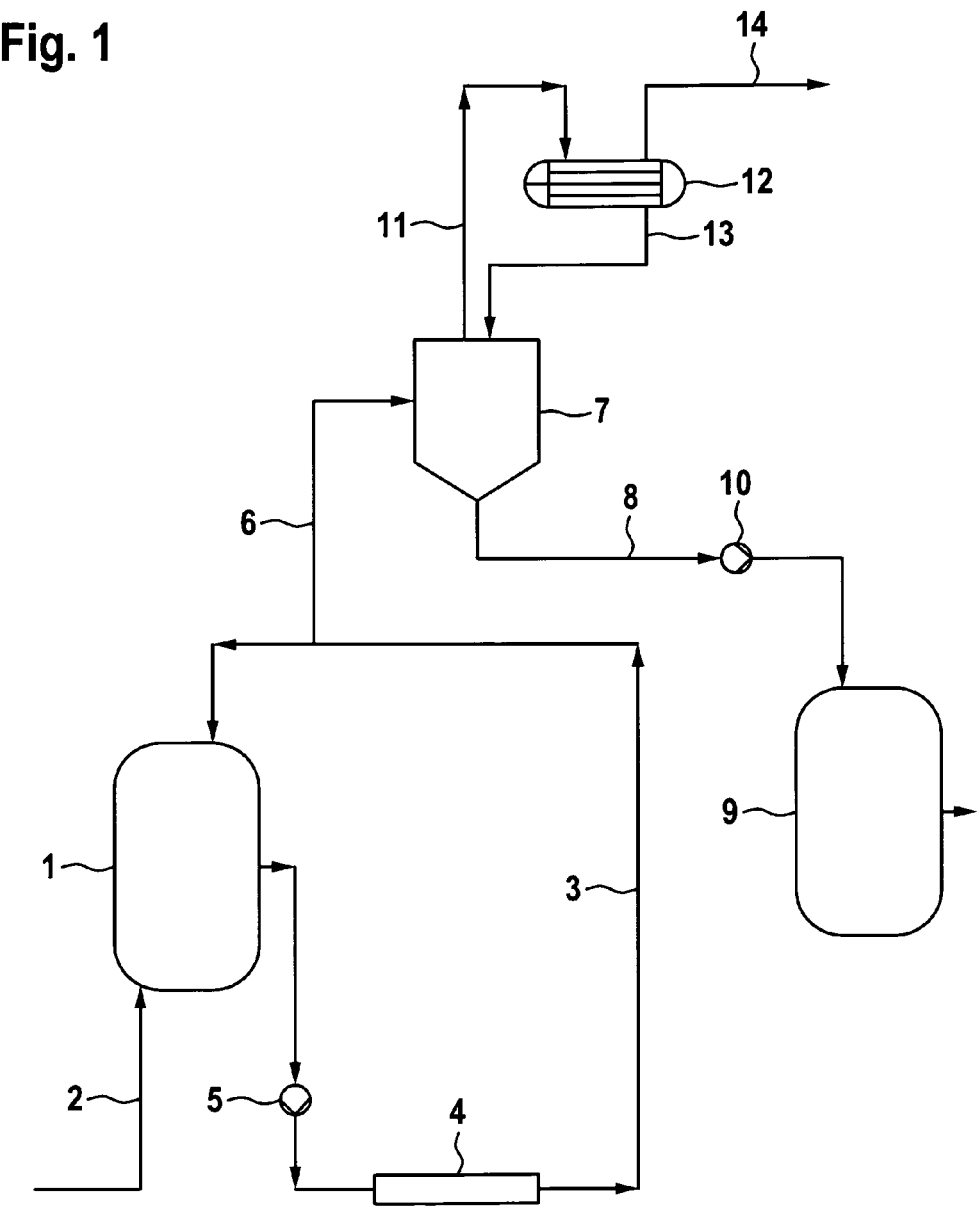
FIGS. 1 and 2 show schematically set-ups for transferring polyolefin suspension from the first to the second polymerization reactor according to the process of the present invention.

The present invention provides a process for the preparation of multimodal polyolefin polymers. In the context of the present invention the term "multimodal" shall indicate that the polyolefin comprises at least two fractions of polymers which are obtained under different polymerization conditions. That means the term "multimodal" as used herein shall includes also "bimodal". The different polymerization conditions can for example be achieved by using different hydrogen concentrations in different polymerization reactors.

The polyolefin polymers which can be obtained by the process of the present invention can be homopolymers or copolymers of olefins and of 1-olefins, i.e. hydrocarbons having terminal double bonds, without being restricted thereto. Preferred monomers are nonpolar olefinic compounds, including aryl-substituted 1-olefins. Particularly preferred 1-olefins are linear or branched $C_2$-$C_{12}$-1-alkenes, in particular linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene. It is also possible to polymerize mixtures of various -olefins. Suitable olefins also include ones in which the double bond is part of a cyclic structure which can have one or more ring systems. Examples are cyclopentene, norbornene, tetracyclododecene or methylnorbornene or dienes such as 5-ethylidene-2-norbornene, norbornadiene or ethylnorbornadiene. It is further possible to polymerize mixtures of two or more olefins.

The process can be used in particular for the homopolymerization or copolymerization of ethylene or propylene. As comonomers in ethylene polymerization, preference is given to using up to 40 wt. % of $C_3$-$C_8$-1-alkenes, in particular 1-butene, 1-pentene, 1-hexene and/or 1-octene. Preferred comonomers in propylene polymerization are up to 40 wt. % of ethylene and/or butane. Particular preference is given to a process in which ethylene is copolymerized with up to 20 wt. % of 1-hexene, and/or 1-butene.

The process can be carried out using all industrially known suspension polymerization processes at temperatures in the range from 40 to 150° C. preferably from 50 to 130° C. and particularly preferably from 60 to 90° C., and under pressures of from 0.1 to 20 MPa and particularly preferably from 0.3 to 5 MPa. Processes of this type are generally known to those skilled in the art.

The polymerization can be carried out using all customary olefin polymerization catalysts. That means the polymerization can be carried out using Phillips catalysts based on chromium oxide, using titanium-based Ziegler- or Ziegler-Natta-catalysts, or using single-site catalysts. For the purposes of the present invention, single-site catalysts are catalysts based on chemically uniform transition metal coordination compounds. Particularly suitable single-site catalysts are those comprising bulky sigma- or pi-bonded organic ligands, e.g. catalysts based on mono-Cp complexes, catalysts based on bis-Cp complexes, which are commonly designated as metallocene catalysts, or catalysts based on late transition metal complexes, in particular iron-bisimine complexes. Furthermore, it is also possible to use mixtures of two or more of these catalysts for the polymerization of olefins. Such mixed catalysts are often designated as hybrid catalysts. The preparation and use of these catalysts for olefin polymerization are generally known.

Preferred catalysts are of the Ziegler type preferably comprising a compound of titanium or vanadium, a compound of magnesium and optionally a particulate inorganic oxide as support.

As titanium compounds, use is generally made of the halides or alkoxides of trivalent or tetravalent titanium, with titanium alkoxy halogen compounds or mixtures of various titanium compounds also being possible. Examples of suitable titanium compounds are $TiBr_3$, $TiBr_4$, $TiCl_3$, $TiCl_4$, $Ti(OCH_3)Cl_3$, $Ti(OC_2H_5)Cl_3$, $Ti(O\text{-}i\text{-}C_3H_7)Cl_3$, $Ti(O\text{-}n\text{-}C_4H_9)C_{l3}$, $Ti(OC_2H_5)Br_3$, $Ti(O\text{-}n\text{-}C_4H_9)Br_3$, $Ti(OCH_3)_2C_{l2}$, $Ti(OC_2H_5)_2C_{l2}$, $Ti(O\text{-}n\text{-}C_4H_9)_2C_{l2}$, $Ti(OC_2H_5)_2Br_2$, $Ti(OCH_3)_3Cl$, $Ti(OC_2H_5)_3Cl$, $Ti(O\text{-}n\text{-}C_4H_9)_3Cl$, $Ti(OC_2H_5)_3Br$, $Ti(OCH_3)_4$, $Ti(OC_2H_5)_4$ or $Ti(O\text{-}n\text{-}C_4H_9)_4$. Preference is given to using titanium compounds which comprise chlorine as the halogen. Preference is likewise given to titanium halides which comprise only halogen in addition to titanium and among these especially titanium chlorides and in particular titanium tetrachloride. Among the vanadium compounds, particular mention may be made of the vanadium halides, the vanadium oxyhalides, the vanadium alkoxides and the vanadium acetylacetonates. Preference is given to vanadium compounds in the oxidation states 3 to 5.

In the production of the solid component, at least one compound of magnesium is preferably additionally used. Suitable compounds of this type are halogen-comprising magnesium compounds such as magnesium halides and in particular the chlorides or bromides and magnesium compounds from which the magnesium halides can be obtained in a customary way, e.g. by reaction with halogenating agents. For the present purposes, halogens are chlorine, bromine, iodine or fluorine or mixtures of two or more halogens, with preference being given to chlorine or bromine and in particular chlorine.

Possible halogen-comprising magnesium compounds are in particular magnesium chlorides or magnesium bromides, Magnesium compounds from which the halides can be obtained are, for example, magnesium alkyls, magnesium aryls, magnesium alkoxy compounds or magnesium aryloxy compounds or Grignard compounds. Suitable halogenating agents are, for example, halogens, hydrogen halides. $SiCl_4$ or $CCl_4$ and preferably chlorine or hydrogen chloride.

Examples of suitable, halogen-free compounds of magnesium are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. Among these, preference is given to using n-butylethylmagnesium or n-butyloctylmagnesium Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

As magnesium compounds for producing the particulate solids, preference is given to using, apart from magnesium dichloride or magnesium dibromide, the $di(C_1-C_{10}-alkyl)$ magnesium compounds. Preferably, the Ziegler-Natta catalyst comprises a transition metal selected from titanium, zirconium, vanadium, chromium.

Catalysts of the Ziegler type are usually polymerized in the presence of a cocatalyst. Preferred cocatalysts are organometallic compounds of metals of groups 1, 2, 12, 13 or 14 of the Periodic Table of Elements, in particular organometallic compounds of metals of group 13 and especially organoaluminum compounds. Preferred cocatalysts are for example organometallic alkyls, organometallic alkoxides, or organometallic halides.

Preferred organometallic compounds comprise lithium alkyls, magnesium or zinc alkyls, magnesium alkyl halides, aluminum alkyls, silicon alkyls, silicon alkoxides and silicon alkyl halides. More preferably, the organometallic compounds comprise aluminum alkyls and magnesium alkyls. Still more preferably, the organometallic compounds comprise aluminum alkyls, preferably trialkylaluminum compounds. Preferably, the aluminum alkyls comprise, for example, trimethylaluminum, triethylaluminum, tri-isobutylaluminum, tri-n-hexylaluminum and the like.

The process of the present invention is carried out in a cascade of at least two polymerization reactors which are connected in series. These reactors are not restricted to any specific design, preferably these reactors are however loop reactors or stirred tank reactors. It is possible that the process of the present invention is only carried out in a cascade of two reactors, the first and the second polymerization reactor, it is however also possible that there are further reactors connected to these reactors upstream or downstream or upstream and downstream. Preferably also the further reactors are connected in series that an extended cascade results. Preferably the further reactors are added downstream of the two reactors. There is no limit to the number of further reactors, however preferably there are not more than two, more preferably only one further reactor added.

If there are further polymerization reactors added to the cascade of the first and the second polymerization reactor these further polymerization reactors can not only be suspension polymerization reactors but can utilize also other low-pressure polymerization methods like gas-phase polymerization. Preferably the further polymerization reactors are suspension polymerization reactors, in particular of the same type as the suspension reactors used in the cascade of the two reactors, or gas-phase reactors like horizontally or vertically stirred gas-phase reactors, fluidized bed gas-phase reactors or multizone circular reactors, in which two polymerization zones are linked to one another and the polymer is passed alternately a plurality of time through these two zones.

The polymerization in the at least two polymerization reactors of the present invention is carried out in suspension in a suspension medium. Hereby a suspension polymerization denotes a polymerization in which the polymerization is carried out in a medium, which is in liquid or in supercritical state under the conditions in the polymerization reactor, and in which the produced polyolefin is insoluble and forms solid particles. The solids content of the suspension is generally in the range of from 10 to 80 wt. %, preferably in the range of from 20 to 40 wt. %.

The suspension medium, which forms the liquid or supercritical phase of the suspension, commonly comprises as main component a diluent but also comprises further components like solved monomers or for example solved hydrogen. Suitable diluents should be inert, i.e. should not decompose under reaction conditions. Preferred diluents are hydrocarbons having from 3 to 12 carbon atoms, and in particular saturated hydrocarbons like isobutane, butane, propane, isopentane, pentane and hexane, or a mixture of these, which is also known as diesel oil. It is also possible to use unsaturated hydrocarbons such as monomers themselves like propylene as diluent. In a preferred embodiment of the present invention the diluent has a boiling point, which is significantly different from those of the monomers and comonomers used, in order to make it possible for these starting materials to be recovered from the product mixture by distillation.

Hydrogen is used in the process of the present invention to control the molecular weight of the polyolefin produced in the respective polymerization reactors, wherein the hydrogen concentration in the first polymerization reactor is higher than in the second polymerization reactor. Accordingly, generally the molecular weight of the polyolefin prepared in the second polymerization reactor is higher than in the first polymerization reactor.

Preferably the pressure in the first polymerization reactor is from 0.1 to 5 MPa and in particular from 0.3 to 1.5 MPa and the temperature is from 50 to 130° C. and in particular from 60 to 90° C.

For transferring the suspension from the first polymerization reaction with the higher hydrogen concentration to the second polymerization reactor with the lower hydrogen concentration the suspension is withdrawn from the first polymerization reactor and fed to a so-called flash drum. Because of the pressure difference between the first polymerization reactor and the flash drum it is normally not necessary to use a pump for transferring the suspension. The suspension can be withdrawn directly from the polymerization reactor. In case of a loop reactor it is also possible to withdraw the suspension from a settling leg. Furthermore, if the first reactor is equipped with an cooling circle it is preferred to withdraw the suspension from the cooling circle, preferably after the circulation pump facilitating the transfer to the flash drum. In such a case the withdrawal point may be located after the heat exchanger. Then a suspension of a lower temperature than that in the first polymerization reactor is fed to the flash drum, limiting the amounts of evaporating components of the suspension medium. More preferable the withdrawal point is located before the heat exchanger. Then the suspension is fed to the flash drum with essentially the same temperature as that of the suspension in the first polymerization reactor and the amount of vaporized material including driven out hydrogen is increased.

A flash drum is generally a vessel which is operated at a lower pressure than that of the first polymerization reactor. Consequently the suspension medium starts to boil in the flash drum and a part of it is vaporized. In addition to evaporating the diluent also gases solved in the suspension are driven to the gas-phase. Accordingly, the concentration of hydrogen in the suspension in the flash drum is significantly lower than the concentration of hydrogen in the suspension in the first polymerization reactor. The flash drum is generally of a volume that it can be operated partly filled with suspension and the remaining part is occupied by the gas mixture escaping from the suspension. The flash drum can be operated with or without a stirrer. It is further possible to have the flash drum equipped with a jacket for cooling or heating the flash drum in order to influence the temperature within the flash drum. It is further possible to use a series of more than one vessel as combined flash drum for the purpose of the present invention.

Preferably the pressure in the flash drum is from 0.1 to 1 MPa and in particular from 0.1 to 0.5 MPa and the temperature is from 50 to 90° C.

The polymer suspension in the flash drum, which is depleted in hydrogen with respect to the suspension fed to the flash drum, is withdrawn from the flash drum and fed to the second polymerization reactor. This is preferably carried out by means of a transfer pump. Preferably the pressure in the second polymerization reactor is from 0.1 to 5 MPa and in particular from 0.2 to 1.2 MPa and the temperature is from 50 to 130"C and in particular from 60 to 90° C.

The gas of the gas-phase in the flash drum is withdrawn from the flash drum and fed to a heat exchanger, where a part of the gas is condensed, while the remaining part, which is not condensed, is preferably fed to the work-up section of the polymerization plant for recovering the components of the suspension medium and in particular directly to the monomer recovery unit. Any kind of heat exchanger can be used, however preferably the heat exchanger is a shell-and-tube heat exchanger. The temperature of the cooling medium, which, for example, can be cooling water or the cooling medium of a chiller, is preferably selected to be in the range of from −20 to 40° C.

The heat exchanger of the process of the present invention can also be designed as a series of two or more heat exchanger, and in particular two heat exchangers, wherein the part of the gas withdrawn from the flash drum, which is not condensed in a first heat exchanger, is fed to a further heat exchanger, where a further part of the gas is condensed. If such a series of heat exchangers is used the one or more first heat exchangers are preferably cooled by cooling water, preferably of a temperature in the range of from 20 to 40° C., and the one or more following heat exchangers are preferably cooled by a chiller, preferably using a cooling medium of a temperature in the range of from −20 to 5'C. If a series of heat exchangers is used it is preferred to combine the liquids obtained in the heat exchangers before returning them to the suspension.

The liquid obtained in the heat exchanger is returned to the polymerization process at a point where suspension is present, i.e. it is fed back to the suspension of solid polyolefin particles in the suspension medium without passing a work-up section of the polymerization plant. It can in principle be returned at all locations of the series of reactors. That can for example be any polymerization reactor or it can be a conduit or a flash drum between polymerization reactors. Preferably the liquid obtained in the heat exchanger is fed to the second polymerization reactor, the flash drum located between the first and the second polymerization reactor or to a polymerization reactor located upstream of the flash drum. By returning the liquid obtained in the heat exchanger to the suspension it is possible to reduce the amount of material needed to be treated in the monomer recovery section. This does not only save energy and consequently costs during the operation but also allows designing a work-up section of a smaller scale, which is beneficial regarding investment costs. Returning the liquid obtained in the heat exchanger to a polymerization reactor is preferably carried out by means of a transfer pump.

In a preferred embodiment of the present invention the liquid obtained in the heat exchanger is returned to a polymerization reactor located upstream of the flash drum and in particular to the first reactor of the cascade of polymerization reactors, that means to the reactor to which the polymerization catalyst is fed. Preferably this first reactor of the cascade of polymerization reactors is also the first polymerization reactor of the two polymerization reactors connected in series; that means that process is carried out with only one polymerization reactor with higher hydrogen concentration before removing it in the flash drum. With respect to feeding the liquid to the flash drum or to the second polymerization reactor or to a polymerization reactor downstream of the second polymerization reactor this set-up provides further advantages. Since the condensation in the heat exchanger takes place in the presence of hydrogen, the liquid obtained in the heat exchanger is saturated with hydrogen. If this liquid is fed to an upstream reactor, where the hydrogen is needed to control the molecular weight of the produced polyolefin, the quantity of hydrogen needed to be fed to the first reactors can be reduced and, even more important, there is no return of hydrogen to the flash drum or the second polymerization reactor. The unavoidable feed of hydrogen to the second polymerization reactor is reduced and accordingly a lower concentration of hydrogen in that reactor is achievable. Furthermore, if the reactor, to which the liquid obtained in the heat exchanger is fed, is the first reactor of the cascade of polymerization reactors the amount of diluent, which is needed to be fed to the first reactor to prepare the suspension, can significantly be reduced since the liquid obtained in the heat exchanger can replace a part of that fresh diluent.

Furthermore, it is also possible to return only a part of the liquid obtained in the heat exchanger to a polymerization reactor located upstream of the flash drum while the remaining part of the liquid is for example fed to the flash drum. A reason for such a set-up could be the intention to limit concentrating of the suspension in the flash drum.

By carrying out the process of the present invention the suspension is not only depleted in the flash drum in hydrogen but also in diluent since not all vaporized components of the suspension medium are condensed in the heat exchanger and can be returned to the flash drum. Consequently the concentration of solid polyolefin particles in the suspension in the flash drum is higher than the concentration of solid polyolefin particles in the first polymerization reactor. Such an increase in the concentration of the solid polyolefin particles in the suspension is even much pronounced if the liquid from the heat exchanger is returned to a polymerization reactor. To balance this increase in concentration if the liquid is fed to a position upstream of the flash drum, it is preferred to feed suspension medium, which is routinely obtained in the work-up of the suspension at the end of the polymerization process when the produced solid polyolefin particles and the suspension medium are separated for example by a hydrocyclone, to the second polymerization reactor.

There are various possibilities for carrying out the process of the present invention. FIG. 1 shows a scheme for a feasible set-up for transferring suspension from a first polymerization reactor to a second polymerization reactor according to the process of the present invention.

The components of the reaction mixture for polymerizing the olefins in the first polymerization reactor (1) in suspension are fed to the reactor via one or more feeding lines (2). The suspension is circulated in cooling circle (3) comprising at least one heat exchanger (4) by means of pump (5). The suspension of the first polymerization reactor (1) is withdraw from the cooling circle (3) after passing heat exchanger (4) and fed through transfer line (6) to flash drum (7).

Suspension depleted in hydrogen is withdrawn from flash drum (7) and fed through transfer line (8) to the second polymerization reactor (9) by means of pump (10), Gas is withdrawn from flash drum (7) and fed through transfer line (11) to heat exchanger (12). A part of the gas fed to heat exchanger (12) is condensed and returned as liquid through transfer line (13) to flash drum (7). The remaining part of the gas fed to heat exchanger (12), which is not condensed, is fed through transfer line (14) to the work-up section of the polymerization plant (not shown).

Figure 2:
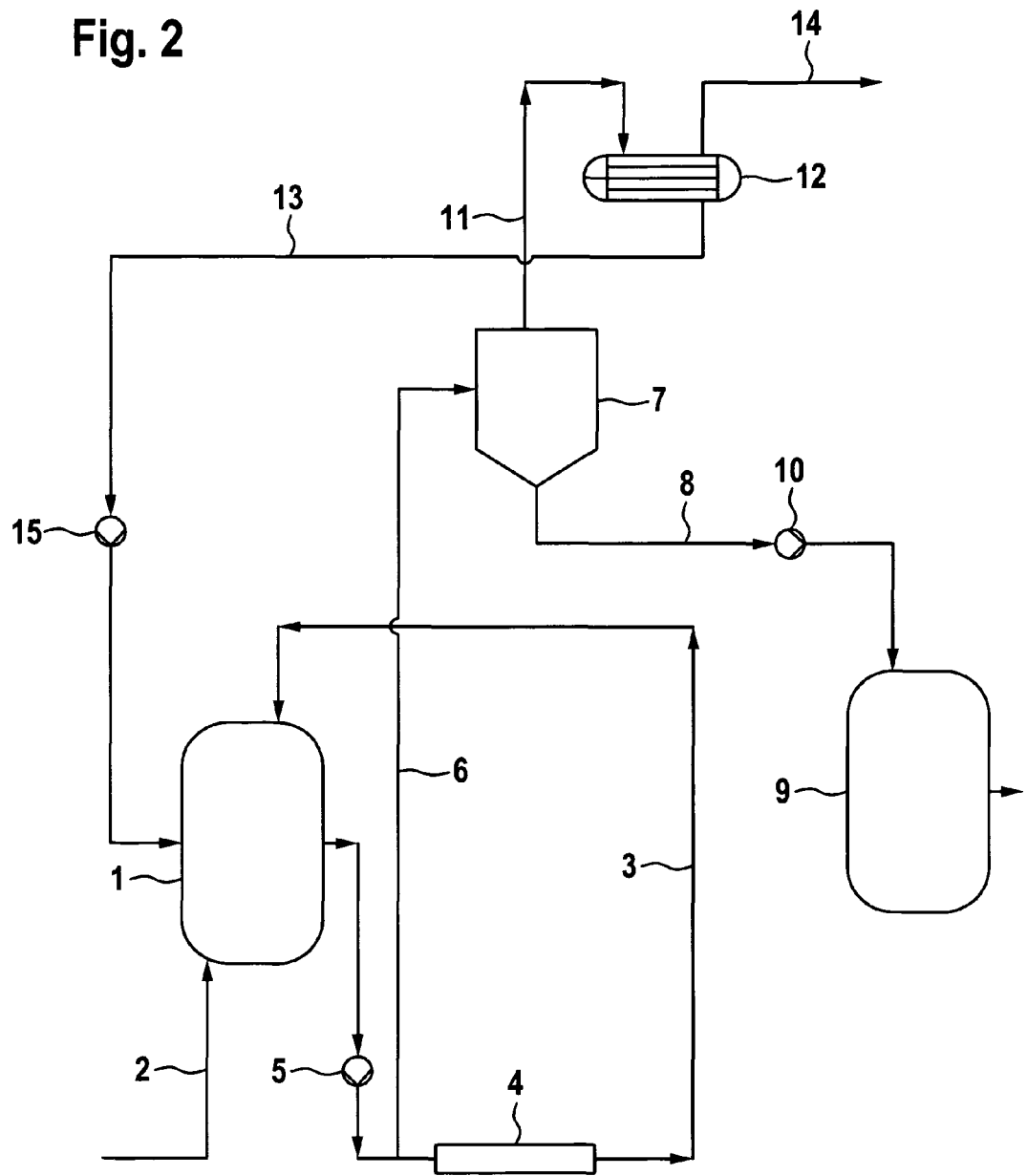

A scheme for a preferred set-up for transferring suspension from a first polymerization reactor to a second polymerization reactor according to the process of the present invention is shown in FIG. 2.

The components of the reaction mixture for polymerizing the olefins in the first polymerization reactor (1) in suspension are fed to the reactor via one or more feeding lines (2). The suspension is circulated in cooling circle (3) comprising at least one heat exchanger (4) by means of pump (5). The suspension of the first polymerization reactor (1) is withdraw from the cooling circle (3) before passing heat exchanger (4) and fed through transfer line (6) to flash drum (7).

Suspension depleted in hydrogen is withdrawn from flash drum (7) and fed through transfer line (8) to the second polymerization reactor (9) by means of pump (10). Gas is withdrawn from flash drum (7) and fed through transfer line (11) to heat exchanger (12). A part of the gas fed to heat exchanger (12) is condensed and returned as liquid through transfer line (13) to polymerization reactor (1) by means of pump (15). The remaining part of the gas fed to heat exchanger (12), which is not condensed, is fed through transfer line (14) to the work-up section of the polymerization plant (not shown).

The present invention further refers to an apparatus for preparing a multimodal polyolefin polymer comprising
a) a first polymerization reactor designed for polymerizing olefins in suspension;
b) a flash drum downstream of the first polymerization reactor;
c) a second polymerization reactor designed for polymerizing olefins in suspension down-stream of the flash drum;
d) a heat exchanger designed for condensing gas, connected to the flash drum by a conduit for transferring gas from the flash drum to the heat exchanger; and
e) a conduit, connected to the heat exchanger for returning the liquid obtained in the heat exchanger to a position of the apparatus where suspension is present.

The flash drum is preferably connected to the first polymerization reactor by a conduit for transferring suspension from the first polymerization reactor to the flash drum and the second polymerization reactor is preferably connected to the flash drum by a conduit for transferring suspension from the flash drum to the second polymerization reactor. The conduit for returning the liquid obtained in the heat exchanger preferably connects the heat exchanger and the flash drum or the heat exchanger and a polymerization reactor upstream of the flash drum. In a most preferred embodiment of the apparatus of the present invention the conduit for returning the liquid obtained in the heat exchanger connects the heat exchanger and the first polymerization reactor.

In another preferred embodiment of the apparatus of the present invention the first polymerization reactor is equipped with an cooling circle comprising a heat exchanger and the conduit for transferring suspension from the first polymerization reactor to the flash drum is connected to the cooling circle, preferably at point where the circulating suspension has not yet passed the heat exchanger.

In a further preferred embodiment of the apparatus of the present invention the heat exchanger designed for condensing gas is a series of two or more heat exchangers which are interconnected by conduits for transferring gas.

We claim:

1. A process for the preparation of a multimodal polyolefin polymer at temperatures of from 40 to 150° C. and pressures of from 0.1 to 20 MPa in the presence of a polymerization catalyst in a first and a second polymerization reactor connected in series, and where optionally further polymerization reactors are connected to said reactors upstream or downstream of said reactors;
  wherein in the first polymerization reactor a first polyolefin polymer is prepared in suspension in the presence of hydrogen and in the second polymerization reactor a second polyolefin polymer is prepared in the presence of a lower concentration of hydrogen than in the first polymerization reactor, the process comprising:
  a) withdrawing from the first polymerization reactor a suspension of solid polyolefin particles in a suspension medium comprising hydrogen;
  b) feeding the suspension to a flash drum of a lower pressure than that of the first polymerization reactor;
  c) vaporizing a part of the suspension medium;
  d) withdrawing a hydrogen-depleted suspension from the flash drum and feeding it to the second polymerization reactor;
  e) withdrawing gas from the gas-phase of the flash drum and feeding it to a heat exchanger;
  f) condensing a part of the gas withdrawn from the flash drum; and
  g) returning the liquid obtained in the heat exchanger to the polymerization process at a point where suspension is present.

2. The process according to claim 1, wherein the liquid obtained in the heat exchanger is returned to the flash drum located between the first and the second reactor.

3. The process according to claim 1, wherein the liquid obtained in the heat exchanger is returned to a polymerization reactor located upstream of the flash drum.

4. The process according to claim 3, wherein the liquid obtained in the heat exchanger is returned to the first polymerization reactor.

5. The process according to claim 1, wherein the first polymerization reactor is equipped with a cooling circle comprising a heat exchanger and the suspension is withdrawn from the cooling circle.

6. The process according to claim 5, wherein the suspension is withdrawn from the cooling circle before passing the heat exchanger.

7. The process according to claim 1, wherein the heat exchanger is a series of at least two heat exchangers and the part of the gas withdrawn from the flash drum, which is not condensed in a first heat exchanger, is fed to a further heat exchanger, where a further part of the gas is condensed.

8. The process according to claim 3, wherein suspension medium, which is obtained by separating suspension medium and solid polyolefin particles in the work-up of the suspension at the end of the polymerization process, is fed to the second polymerization reactor.

9. An apparatus for preparing a multimodal polyolefin polymer comprising:
 a) a first polymerization reactor designed for polymerizing olefins in suspension;
 b) a flash drum downstream of the first polymerization reactor;
 c) a second polymerization reactor designed for polymerizing olefins in suspension downstream of the flash drum;
 d) a heat exchanger designed for condensing gas, connected to the flash drum by a conduit for transferring gas from the flash drum to the heat exchanger; and
 e) a conduit, connected to the heat exchanger for returning the liquid obtained in the heat exchanger to a position of the apparatus where suspension is present.

10. The apparatus according to claim 9, wherein the conduit for returning the liquid obtained in the heat exchanger connects the heat exchanger and the flash drum.

11. The apparatus according to claim 9, wherein the conduit for returning the liquid obtained in the heat exchanger connects the heat exchanger and a polymerization reactor upstream of the flash drum.

12. The apparatus according to claim 11, wherein the conduit for returning the liquid obtained in the heat exchanger connects the heat exchanger and the first polymerization reactor.

13. The apparatus according to claim 9, wherein the first polymerization reactor is equipped with an cooling circle comprising a heat exchanger and the conduit for transfer-ring suspension from the first polymerization reactor to the flash drum is connected to the cooling circle.

14. The apparatus according to claim 13, wherein the conduit is connected to the cooling circle at a point where the circulating suspension has not yet passed the heat exchanger.

15. The apparatus according to claim 9, wherein the heat exchanger designed for condensing gas is a series of at least two heat exchangers which are interconnected by conduits for transferring gas.

* * * * *